Figure 1:
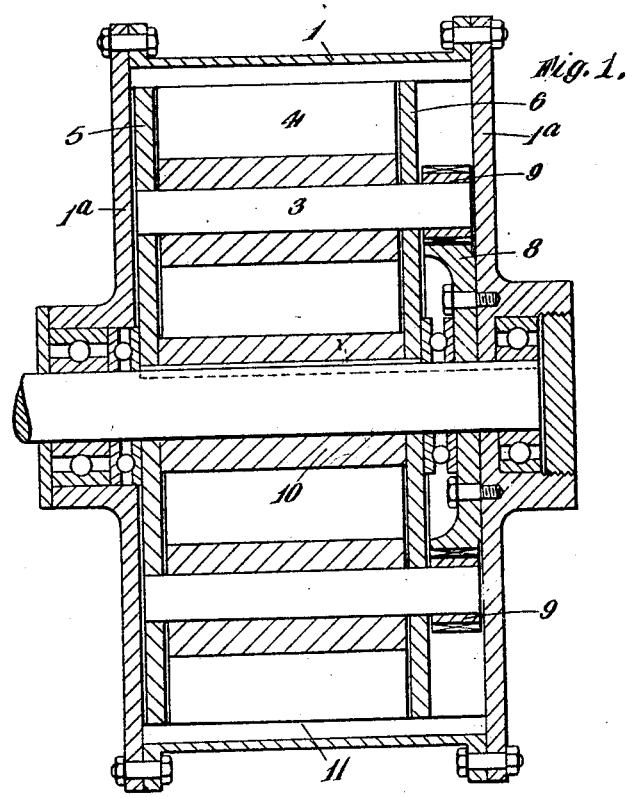

Sept. 2, 1924.

A. E. ESCOTT 1,507,369

POWER TRANSMITTING APPARATUS

Filed March 6, 1924  2 Sheets-Sheet 1

Sept. 2, 1924.
A. E. ESCOTT
1,507,369
POWER TRANSMITTING APPARATUS
Filed March 6, 1924    2 Sheets-Sheet 2
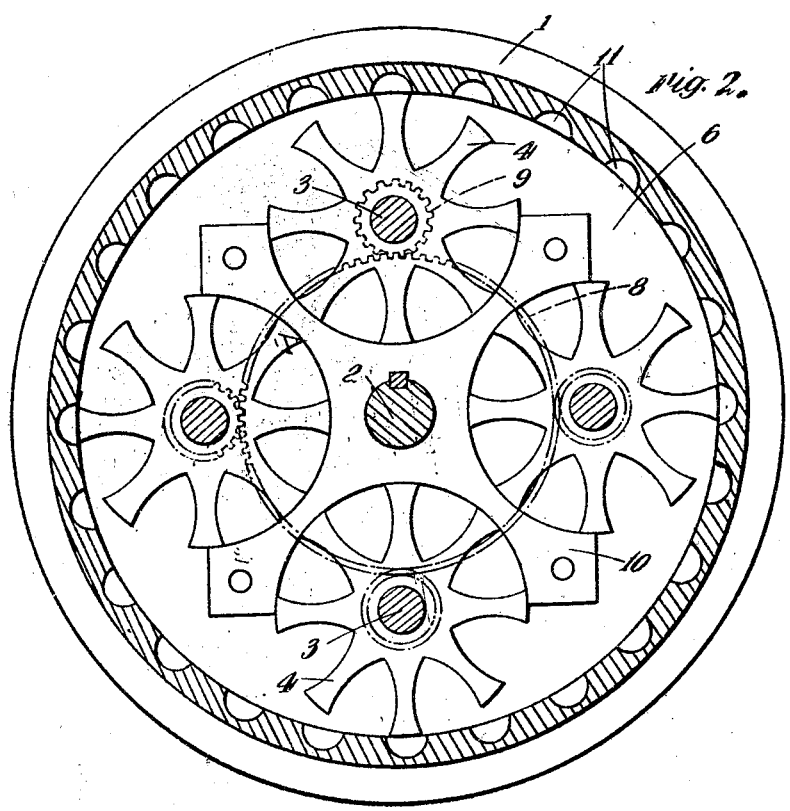

Patented Sept. 2, 1924.

1,507,369

UNITED STATES PATENT OFFICE.

ALBERT EDWARD ESCOTT, OF LONDON, ENGLAND.

POWER-TRANSMITTING APPARATUS.

Application filed March 6, 1924. Serial No. 697,173.

*To all whom it may concern:*

Be it known that I, ALBERT EDWARD ESCOTT, a subject of the King of Great Britain, residing at Oaknoll, 27, Central Hill, Upper Norwood, London, in the county of Surrey, England, have invented certain new and useful Improvements in or Relating to Power-Transmitting Apparatus (for which I have filed an application in Great Britain, No. 21,713, dated 9th August, 1922), of which the following is a specification.

In a power transmitting apparatus according to the present invention one element, say the driving element, comprises a rotatable enclosed vessel preferably a drum shaped vessel rotatable around its geometric axis, this vessel containing a quantity of liquid. For convenience of description this vessel will be hereinafter referred to as the drum. The other element, say the driven element, is located within the drum and comprises one or more but preferably at least two spindles each provided with a number of blades or vanes disposed in or approximately in planes radial to the axis of the spindle. The spindles with their vanes (hereinafter termed paddles), are disposed around the axis of rotation of the drum with their axes parallel thereto in squirrel-cage fashion and the ends of the spindles are mounted in bearings carried by supports consisting of discs, radial arms or the like which supports are so mounted as to be capable of free rotation about the axis of rotation of the drum independently of the latter. The dimensions of the paddles are such that they are capable of free and independent rotation and they are preferably so disposed that in rotating the edges of the vanes only just clear the internal surface of the drum. The supports are rigidly mounted on or otherwise suitably connected with the shaft or other element to be driven. Thus the supports may consist of two parallel discs keyed to an axial shaft, their peripheries making a working fit with the inner cylindrical surface of the drum. The enclosing drum may be mounted so as to be capable of free rotation around the said shaft and the two elements are interconnected by sun and planet gearing, the sunwheel being carried by the drum and the planet wheels by the paddle spindles.

If desired a series of inwardly projecting vanes may be provided on the internal cylindrical surface of the drum, these being arranged to clear the edges of the vanes of the paddles during relative rotation between the driving and driven elements, or such inwardly projecting vanes may be narrow in relation to the width of the paddle vanes and arranged to project into the path of the latter, in which case the paddle vanes are suitably notched to allow of the passage of the vanes carried on the drum. If desired the transmission may be reversed, that is to say, what has been referred to as the driven member may be made the driving member and vice versa.

In order that the invention may be clearly understood and readily carried into effect it will now be described more fully with reference to the accompanying drawings in which:—

Figures 1 and 2 are sections taken on planes at right angles to each other and illustrating a transmission gearing according to the present invention.

Referring to the drawings, the device therein illustrated comprises a driving element consisting of a drum 1 rotatable freely on the shaft 2 and containing a quantity of liquid such for example as glycerine. The driven element is located within the drum and comprises four spindles 3 each provided with a number of vanes 4 disposed in planes radial to the axes of the spindles, these spindles with their vanes constituting the paddles hereinbefore referred to and being disposed around the axis of rotation of the drum with their axes parallel thereto in squirrel-cage fashion. The spindles are mounted in bearings in discs 5, 6, which are keyed to the shaft 2 and freely rotatable within the drum 1, their peripheries making a working fit with the inner cylindrical surface of the drum. The paddles are so disposed and dimensioned as to be capable of free and independent rotation with the edges of the vanes just clearing the internal surface of the drum.

The paddles are geared together by sun and planet gearing the sun wheel 8 being fixed to the drum and the planet wheels 9 to the paddle spindles. Let it be assumed that the discs and paddles constitute the driving member and the drum the driven member, the discs being keyed to the shaft 2 and the drum free upon this shaft. Assuming a load on the driven member and no resistance to rotation of the paddles, on rotation of the driving member the planet wheels 9 would simply roll around the sun wheel 8 the paddles rotating and the sun wheel and drum remaining stationary. The liquid medium in the drum, however, offers resistance to the rotation of the paddles and if this resistance to turning balances the resistance to turning of the sun wheel 8 and drum the paddles will not rotate on their own spindles but will carry the said sun wheel and drum around at the same angular speed as the driving element as a whole. If, however, the resistance to turning of the driven element is greater than the resistance to turning of the paddles the latter whilst still carrying the driven element around will have also a rolling movement around the sun wheel and the driven element will lag in speed behind the driving element. The degree of this lag will depend upon the load on the driven element and thus an automatic variation of speed ratio depending upon the load is obtained. Moreover, the greater the difference in speed between the paddle system and the drum, that is to say the lower the gear, the greater is the speed of rotation of the paddles, the greater the reaction of the liquid against them, the greater the resistance of the planetary wheels to turning and consequently the greater the turning effort on the drum. It is preferred to shroud the vanes of the paddles adjacent to the axis of the device by means of a star shaped core 10 fixed to the shaft and rotating therewith as part of the driving element. It is also preferred to provide grooves 11 on the inner cylindrical surface of the drum to give the effect of inwardly projecting vanes. If desired the drum may be made the driving element and the discs and paddles the driven element. In this case assuming the driving element (the drum and sun wheel) to be rotating with a load on the driven element (discs, paddles and planet wheels) and no resistance to rotation of the paddles, the latter would be rotated on their own spindles in a direction contrary to the direction of rotation of the driving element and the driven element as a whole would not rotate. The liquid medium in the drum, however, being carried round owing to the rotation of the drum offers a resistance to the rotation of the paddles thus causing the driven element as a whole to be carried round by the sun wheel. The driven element will, however, lag in speed behind the driving element according to the load on the former.

What I claim and desire to secure by Letters Patent of the United States is:—

1. A power transmitting apparatus comprising driving and driven members, a drum rotatable about its geometric axis, said drum containing a quantity of liquid and constituting one element of the power transmitting apparatus, supports within said drum, said supports being freely rotatable about the axis of the drum, a system comprising paddles rotatably mounted and in squirrel cage fashion on said supports, said system constituting the other element of the power transmitting apparatus, a sun-wheel carried by the drum and planet wheels carried by said paddles and engaging said sun-wheel for transmitting motion from one member to the other.

2. A power transmitting apparatus comprising driving and driven members, a drum rotatable about its geometric axis, vanes upon the inner cylindrical surface of the drum, said drum containing a quantity of liquid and constituting one element of the power transmitting apparatus, supports within said drum, said supports being freely rotatable about the axis of the drum, a system comprising paddles rotatably mounted and in squirrel cage fashion on said supports, said system constituting the other element of the power transmitting apparatus, a sun-wheel carried by the drum and planet wheels carried by said paddles and engaging said sun-wheel for transmitting motion from one member to the other.

3. A power transmitting apparatus comprising, a drum rotatable around its geometric axis, said drum containing a quantity of liquid and constituting one element of the transmitting apparatus, supports within said drum, said supports being freely rotatable about the axis of the drum, a system comprising paddles rotatably mounted and in squirrel cage fashion on said supports, a star-shaped core constituting a shroud for those vanes of the paddles which are adjacent to the axis of the apparatus, said system constituting the other element of the power transmitting apparatus, a sun-wheel carried by the drum and planet wheels carried by said paddles and engaging said sun-wheel for transmitting motion from one member to the other.

4. A power transmitting apparatus comprising a driving shaft, discs rigidly mounted upon said shaft in spaced relationship, a system comprising paddles rotatably mounted and in squirrel cage fashion between said discs, a drum freely mounted upon said shaft and inclosing said system, said drum constituting the driven element, a sun-wheel rigidly mounted upon an inner face of one side wall of the drum, between said side wall and one of the discs, and planet wheels rigidly mounted upon the paddle spindles, said planet wheels engaging the sun-wheel for transmitting motion from one element to the other.

ALBERT EDWARD ESCOTT.